United States Patent [19]

Ammann et al.

[11] 4,175,854

[45] Nov. 27, 1979

[54] MICROFICHE RECORDER

[75] Inventors: Stephen K. Ammann, Cupertino; Peter E. Herborn, Menlo Park, both of Calif.

[73] Assignee: Quantor Corporation, Mountain View, Calif.

[21] Appl. No.: 874,170

[22] Filed: Feb. 1, 1978

[51] Int. Cl.² ............................................. G03B 27/44
[52] U.S. Cl. ........................................ 355/54; 355/29; 355/73
[58] Field of Search .................. 355/53, 54, 73, 28, 355/29

[56] References Cited

U.S. PATENT DOCUMENTS

| | | | |
|---|---|---|---|
| 3,260,153 | 7/1966 | Abbott, Jr. et al. | 355/73 X |
| 3,674,367 | 7/1972 | Chapman | 355/29 X |
| 3,746,444 | 7/1973 | Kahle et al. | 355/28 |

*Primary Examiner*—Richard A. Wintercorn
*Attorney, Agent, or Firm*—J. T. Cavender; Wilbert Hawk, Jr.; George J. Muckenthaler

[57] ABSTRACT

A microfiche recorder has an X carriage movable along a guide in the X direction and a Y carriage mounted on the X carriage and movable in the Y direction. The guide provides a pivot connection wherein the X carriage and the Y carriage are swingable in a Z direction toward an away from a microfiche holding platen.

40 Claims, 9 Drawing Figures

MICROFICHE RECORDER

BACKGROUND OF THE INVENTION

Data storage and retrieval today rely heavily on microfiche recording of the data. Alphanumeric characters are phtographically reduced so that a printed page occupies a space of less than one centimeter square on the microfiche medium. By thus compressing approximately 200 printed pages into an area of approximately 3"×5", the space required to store the data is drastically reduced.

Data is recorded on a microfiche by sequentially exposing different portions of the film to the different pages of printed data. To accomplish this, a piece of microfiche film (usually from a roll) is held horizontal in a platen which may then be moved in a rectilinear fashion over a horizontal reference plate having an optical aperture through which page images are projected onto the film.

A satisfactory microfiche recorder must provide highly accurate registration of the film to ensure reliable data retrieval. In particular, perpendicularity of the rows and columns in which the reduced pages are arranged must be maintained in order to ensure that the microfiche can be properly read on microfiche readers. Also, the film must be precisely held in a plane so that defocusing of the projected images does not occur. This is especially critical if the microfiche is to be used as a master for producing copies.

The microfiche recorder must also be able to perform the film movement over the reference plate in a rapid manner. This is clearly essential when large volumes of data are to be transcribed, as in the case when computer output is being recorded on microfiche. It can also be seen that a microfiche recorder must be able to operate with a minimum amount of maintenance in order to ensure that intolerable backlogs of data to be recorded do not occur.

A typical prior art microfiche recorder is disclosed in U.S. Pat. No. Re. 29,254 to Kahle, et al. In that patent, platen movement is accomplished by means of mutually perpendicular lead screws driven by servo motors, and drive nuts on the platen. An arrangement making use of lead screws has several difficulties. A certain amount of backlash is virtually unavoidable in a lead screw drive system. This leads to inaccuracies in the registration of the platen, and may result in undesirable vibrations when the platen undergoes the relatively large accelerations that occur. Additionally, the lead screws tend to constrain vertical movement of the platen so that its removal for cleaning, inspection, etc. is rendered difficult, thereby increasing maintenance time. In addition, it is necessary to maintain critical parallelism and mutual perpendicularity between the lead screws and the guide rails which control the movement of the platen, since any misalignment can cause excessive wear and aggravate existing blacklash and misalignment problems.

A further difficulty with prior art microfiche recorders is that no provision is made for decoupling the platen from the driving means when the platen undergoes excessive acceleration or deceleration. In certain malfunction situations, the platen can be driven with great force against stationary portions of the apparatus. Platen damage as well as damage from shock transmitted to the drive system can occur.

In order to provide for rapid platen movement, the mass being moved should be kept to a minimum. Failure to do this can result in excessive strain on the driving system, or the requirement of unduly large and powerful components. Prior art microfiche recorders, in an effort to eliminate film misalignment and twisting problems have sometimes resorted to mounting the film supply rigidly to the platen. Although this can greatly facilitate the alignment of the film and its handling, it also adds substantially to the mass that must be repeatedly accelerated.

SUMMARY OF THE INVENTION

The invention is a microfiche recorder in which only a small number of components require critical alignment, backlash has been substantially eliminated, and the platen is easily decoupled from the driving system for ease of access as well as safety in malfunction situations. The mass that must be accelerated along the column recorded direction of the microfiche is kept to a minimum beyond that mass of the platen itself.

In its broadest sense, the recorder comprises a fixed structure including an apertured reference plate and means for projecting an image therethrough, and a moveable platen for holding a piece of film for rectilinear motion over the reference plate aperture. An X carriage and a Y carriage allow this movement. The X and Y axes normally are horizontal mutually perpendicular directions that define movement parallel to the plane of the reference plate.

The X carriage is provided with fixed means for guiding it along the X direction while constraining it against movement in the Y direction. The Y carriage is provided with guide means mounted to the X carriage so that the Y carriage can move relative to the X carriage in the Y direction only. Movement of the X carriage results in corresponding movement of the Y carriage along the X direction. The Y carriage is coupled to the platen so that rectilinear motion of the platen in the XY plane can occur. Separate X and Y driving means are provided for driving the X and Y carriage.

According to one aspect of the invention the X carriage guide means includes a first cylindrical elongate bar attached to the fixed structure and extending in the X direction, while the X carriage has a corresponding journal bearing which engages the bar and is free to slide along it. The bearing allows rotation of the X carriage about the bar, thereby allowing vertical motion of those portions of the X carriage remote from the bar. The Y carriage guide means includes a second cylindrical elongate bar attached to the X carriage and perpendicular to the first elongate bar. The Y carriage has a corresponding journal bearing which engages the bar and is free to slide along it.

Coupling between the Y carriage and the platen is effected by a plurality of vertically extending pins, and a corresponding plurality of cooperating tapered depressions. The pins are preferably on the Y carriage; the depressions on the platen. The transmission of forces from the Y carriage to the platen is insured by biasing the X carriage (and therewith the Y carriage) downwardly toward the suppport surface and hence against the platen. The biasing means allow a limited vertical movement of the X carriage, at least in the region remote from the X guide means, so that the platen may be easily decoupled from the Y carriage by the expedient of lifting the X carriage away from the platen in opposition to the biasing means. The strength of the biasing means and the angle of the tapered depressions are chosen to result in decoupling in the event excessive forces are generated between the Y carriage the platen.

The X carriage driving means includes a first reversible drive motor in operative engagement with a first cable having its ends anchored to the fixed structure, with means mounted to the X carriage for imparting movements of the first cable to the X carriage. The Y carriage drive means includes a second reversible motor in operative engagement with a second cable the ends of which are anchored to the fixed structure. A first plurality of pulleys is mounted to the X carriage at a location intermediate the X carriage guide rod and the Y carriage, a second plurality of pulleys mounted to the X carriage on the side of the Y carriage remote from the first plurality of pulleys, and a third plurality of pulleys mounted to the Y carriage. The second cable engages the first, second and third pluralities of pulleys to impart motion, along the Y direction only, to the Y carriage in response to actuation of the second drive motor.

The elimination of lead screws through the use of pulleys and cables results in a system substantially free of backlash problems. Spring means at one end of each cable takes up any slack that may possibly arise due to wear, stretching, etc. Critical alignment problems are also avoided since the pulley system can tolerate a certain small amount of relative movement along the various components without causing excessive wear or binding. In particular, this makes it possible to provide for upward movement of the X carriage (and the Y carriage therewith) away from the platen.

A film supply adapted to be severed into individual microfiches is carried by the fixed structure. Loading of the film into the platen is accomplished by first locating the platen in a position adjacent the film supply. Film feed rollers advance fresh film into film guide rails carried by the platen. Means is further provided for severing a portion of the film from the film supply once the film has been advanced into the platen. Contact between the film and the reference plate is prevented by an air bearing generated by pressured air which escapes from a plurality of openings in the reference plate surface that extend along the direction of travel of the fresh film as it moves into the platen. Vacuum means biases the film against the underside of the platen during the exposure of the fiche. The exposed fiche is preferably withdrawn from the platen by rollers, and is protected from contact with the reference surface by air bearing means. The exposed microfiche, once withdrawn from the platen, is then further processed, e.g. developed, fixed and dried.

DESCRIPTION OF THE PREFERRED EMBODIMENT

Figure 1:
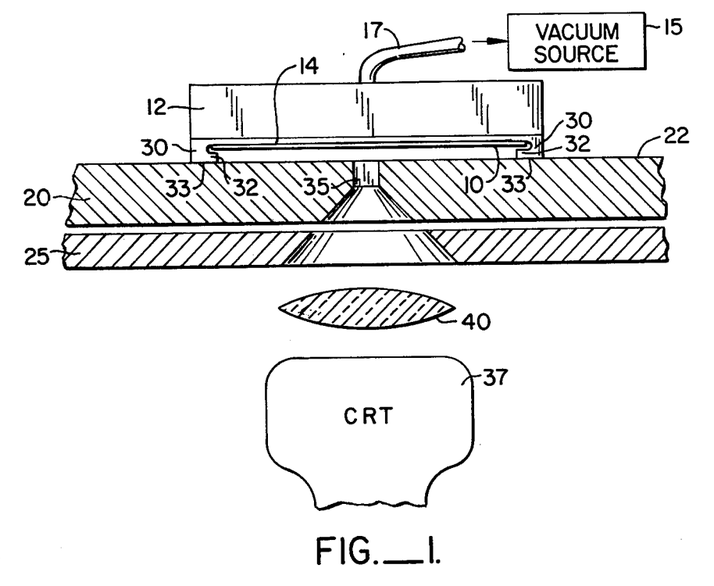
FIG. 1 is a schematic view of the platen and optical system.

The present invention is a microfiche recorder, the basic function of which is to record a plurality of photographic images of data on a sheet of film. The schematic of FIG. 1 illustrates the basic operation of such a microfiche recorder. A sheet of film 10 is held to the undersurface 14 of platen 12 by vacuum source 15 communicated to platen 12 by vacuum hose 17. A reference plate 20 having a precision ground flat top surface 22 is mounted to a fixed supporting structure 25. Surface 22 is normally horizontal, and will be assumed so in the remainder of this specification. A pair of L shaped legs or rails 30 maintain film 10 at a separation from surface 22, thereby preventing scratching of the delicate film emulsion. Additionally, legs 30 have inwardly protruding portions 32 which prevent the film from dropping down when not held in place by the vacuum. Surfaces 33 of legs 30 confront surface 22 of reference plate 20. Thus, the L shaped legs in conjunction with the undersurface 14 of the platen define a film guide which permits longitudinal but not lateral movements of the film in the platen.

Reference plate 20 has a rectangular aperture 35 through which an image of printed data is projected. A typical projection system includes a cathode ray tube 37 and imaging optics 40. The location of cathode ray tube 37 and optics 40 is such that the image is formed in the plane of film 10.

The location of the image on film 10 will clearly depend on the position of platen 12 relative to aperture 35. One aspect of the present invention is the provision of improved means for moving platen 12 over reference plate 20 in a rectilinear fashion so as to record a plurality of images in a rectilinear array on the film. To prevent wear on reference plate surface 22 or on platen leg surfaces 33, legs 30 are preferably constructed of a low friction material such as a teflon impregnated plastic. Surface 22 may also be coated with a low friction material.

Figure 2A:
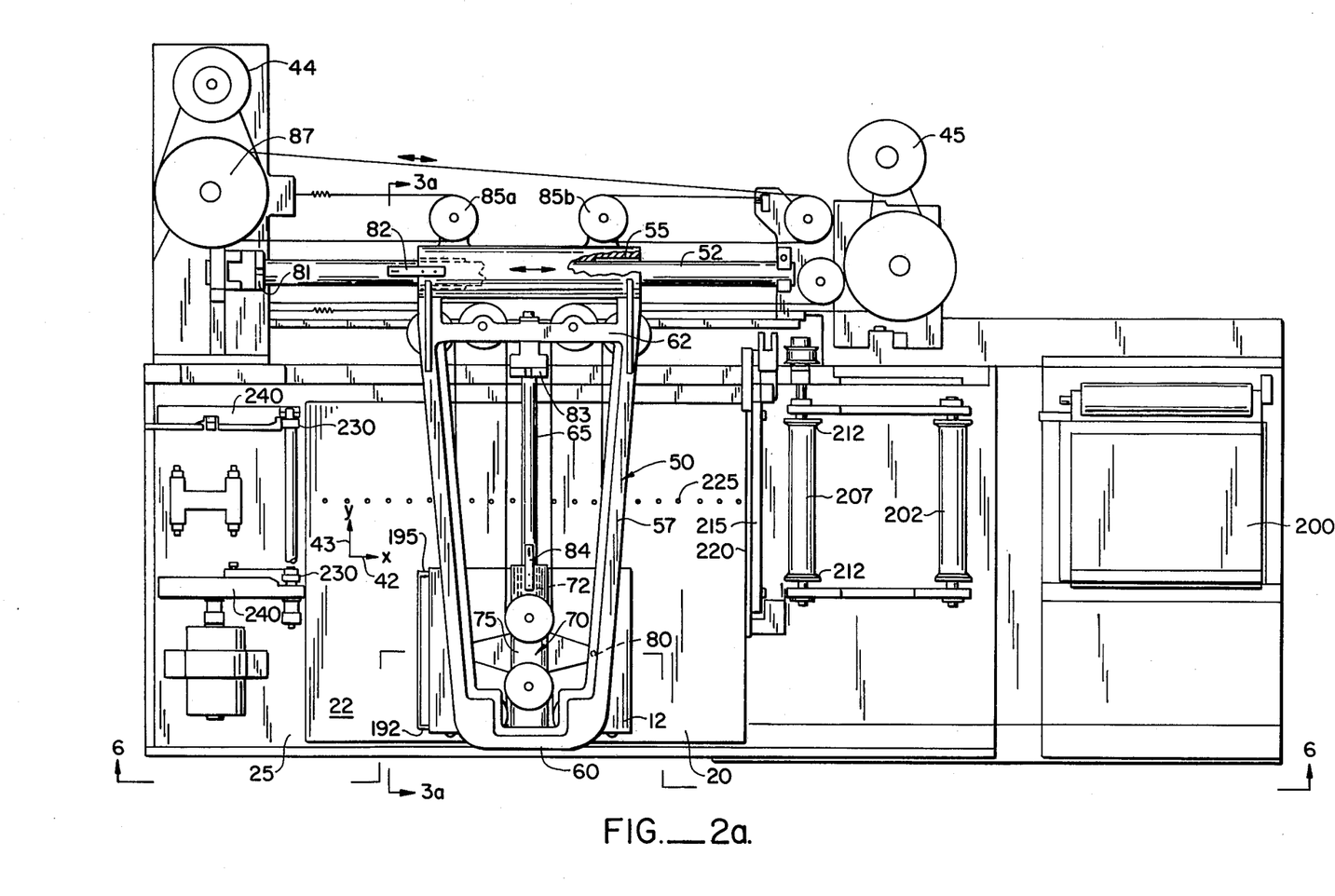
FIG. 2A is an overall plan view of a microfilm recording apparatus constructed in accordance with the invention and shows the carriages, the carriages driving systems, and the film transport system.

FIG. 2A is an overall plan view of the microfiche recorder. For convenience it is useful to define a coordinate system having mutually perpendicular X and Y axes 42 and 43 parallel to the plane of surface 22. Broadly, X and Y servo motors 44 and 45 impart motion along the X and Y axes to X carriage 50 and Y carriage 70 respectively, thus moving platen 12 in the desired fashion. The servo motors are standard articles of commerce such as a DC servo motor with an optical tachometer manufactured by the Electro-Craft Corporation of Hopkins, Minn.

A servo control is suitably programmed or actuated by a main computer operated control unit to drive platen 12 toward its home position near the upper left corner (with respect to FIG. 2A) of reference plate 20. Arrival of platen 12 at its home position is sensed independently as described below. Thereafter, and in coordination with the formation of images on CRT 37, X and Y servos 44 and 45 are intermittently energized to advance the platen for linear recordation of images in rows and columns along the X and Y axes respectively. The normal format has data recorded sequentially within a given column so that most of the platen movements are along the Y direction. Only one movement in the X direction is required for each column, while every image requires a movement in the Y direction.

Figure 3A:
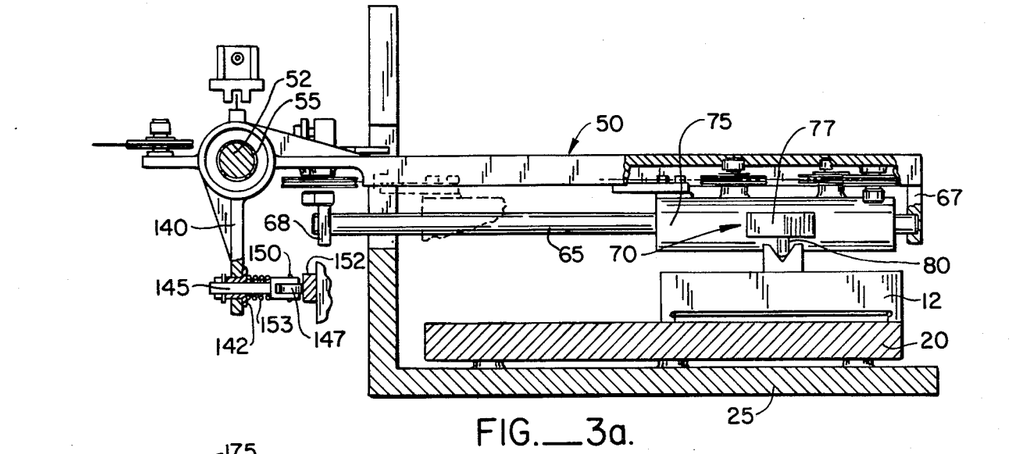
FIG. 3A is a side section taken along line 3A—3A of FIG. 2A showing the mechanism for downward biasing of the X carriage.
Figure 4:
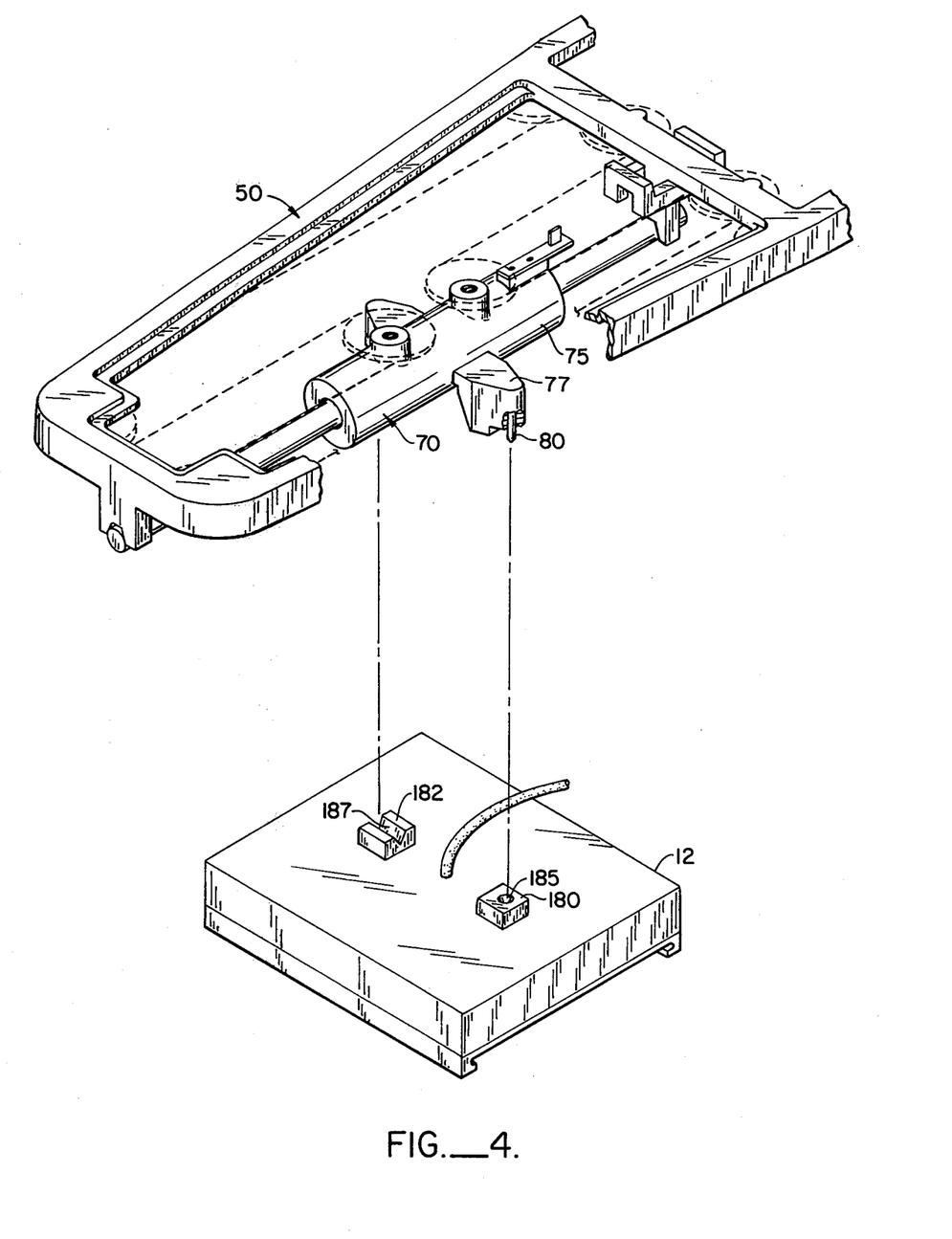
FIG. 4 is an exploded cut away perspective showing the coupling between the carriages and the platen.

The detailed construction of X and Y carriages 50 and 70 is best understood by reference to FIGS. 2A, 3A, and 4.

X carriage assembly 50 is free to move along a direction parallel to the X axis. This degree of freedom is defined by elongate cylindrical rod or bar 52 (hereinafter X bar 52) which is fastened at both its ends to the fixed structure. Carriage assembly 50 is provided with journal bearings 55 which snugly engage X bar 52 and are free to slide along it.

X carriage 50 is an open generally horizontal frame defined by a pair of arms 57 which extend in the Y direction away from journal bearings 55. The arms are joined at their ends remote from X bar 52 by end portion 60. Arms 57 are also joined near journal bearings 52 by a cross member 62. X carriage 50 is provided with an elongate cylindrical rod or bar 65 (hereinafter Y bar 65) which extends along the Y axis perpendicular to X bar 52. Y bar 65 is mounted to downwardly extending Y bar mounts 67 and 68 which depend from end portion 60 and cross member 62 respectively. Each Y bar mount has a downwardly facing V groove into which Y bar 65 is seated and bolted.

Y carriage 70 is provided with journal bearings 72 which snugly engage Y bar 65 and are free to slide along it. Y carriage 70 has a generally tubular main member 75 and paired outwardly extending wings 77. Each wing 77 is provided with a downwardly protruding pin 80 for coupling to platen 12 as will be described in more detail below. Thus it can be seen, that platen 12 can have motion along the X axis imparted to it by moving X carriage 50 along X bar 52. Motion of platen 12 along the Y axis is provided by causing Y carriage 70 to move along Y bar 65.

It can be seen that the platen will be in its home position when X carriage 50 nears its leftmost position along X bar 52 and when Y carriage 70 nears its uppermost position along Y bar 65. These conditions are sensed optically. Detector 81 mounted near the end of X bar 52 is provided with a light source and a photodetector in optical communication. An interruptor such as a blade 82 is mounted on X carriage 50 and is positioned to interrupt the optical communication when the carriage is at the desired position. Similarly, detector 83 on X carriage 50, and interruptor 84 on Y carriage 70 sense the Y motion.

Figure 2B:
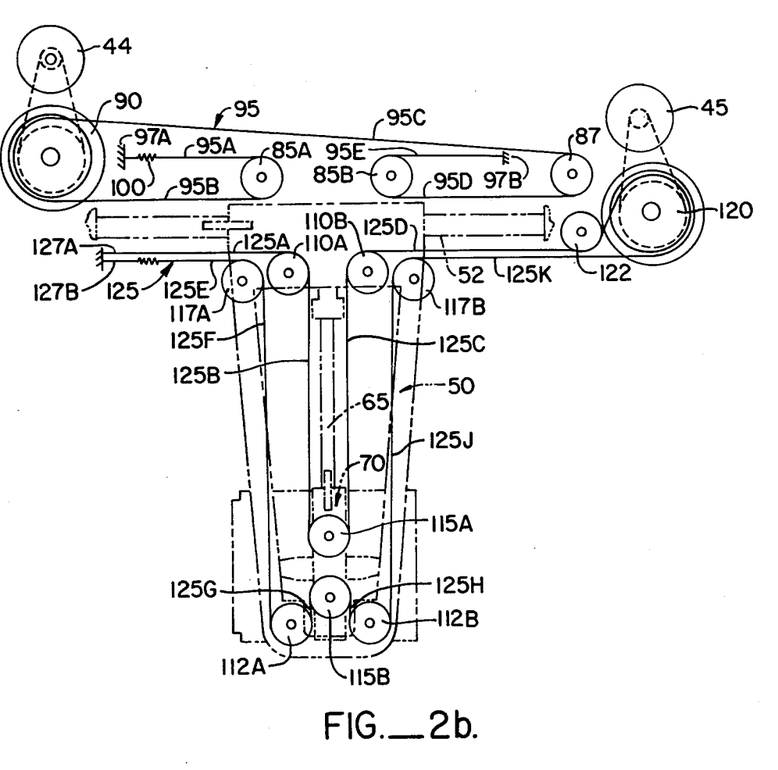
FIG. 2B is a schematic plan view showing the pulley and cable arrangement for driving the carriages.

The mechanism whereby rotary motion of servo motors 44 and 45 is transmitted to produce linear motion of X carriage 50 and Y carriage 70 along X bar 52 and Y bar 65 respectively is shown in FIG. 2A, and more clearly in FIG. 2B. Independent pulley and cable systems are employed. FIG. 2B shows the pulleys and cables with the carriages in phantom.

Turning first to the X carriage driving system, X carriage 50 has mounted thereon paired X pulleys 85A and 85B. The fixed structure has mounted thereon pulley 87 and X drive pulley 90, while pulleys 85A and 85B are mounted to the X carriage. The ends of an X cable 95 are anchored to the support structure at anchor point 97A between pulley 85A and pulley 90, and anchor point 97B between pulley 85B and pulley 87. Tension in cable 95 is maintained by an anchor spring 100, shown near anchor point 97A. Proceeding from anchor point 97A, X cable 95 engages pulley 85A, pulley 90, pulley 87, and pulley 85B, whereupon it is anchored at point 97B. Cable 95 is preferably wound around pulley 90 an extra revolution. Pulley 90 is driven by X servo motor 44. Pulleys 85A, 90, 87 and 85B define X cable segments 95A, 95B, 95C, 95D and 95E. Segments 95A, 95B, 95D and 95E are parallel to the X axis.

Assuming a clockwise rotation of pulley 90, it can be seen that cable segments 95A and 95B are shortened, with the slack being taken up by a corresponding increase in length in cable segments 95D and 95E. Cable segment 95C between pulleys 90 and 87 remains constant. Thus, X servo motor 44 is able to impart X directional motion to X carriage 50.

The Y carriage driving system is somewhat more intricate due to the requirement that the activation of the X servo motor only, with corresponding motion of the X carriage, must not result in any movement of the Y carriage in the Y direction.

A first pair of pulleys 110A and 110B are mounted to cross member 62 of X carriage 50. A second pair of pulleys 112A and 112B are mounted to end portion 60. A third pair of pulleys 115A and 115B are mounted to Y carriage 70. A fourth pair of pulleys 117A and 117B are mounted to arms 57 of X carriage 50. Y drive pulley 120 and pulley 122 are mounted to the fixed structure. Y cable 125 is anchored to the fixed support structure at anchor points 127A and 127B, which are relatively closely spaced and on the same side of X carriage 50.

It is convenient to regard Y cable 125 as comprising a first strand between anchor point 127A and Y drive pulley 120, the first strand including segments 125A, 125B, 125C and 125D between adjacent members of the group consisting of anchor point 127A, pulley 110A, pulley 115A, pulley 110B and pulley 122.

The second strand includes segments 125E, 125F, 125G, 125H, 125J, and 125K, the segments being those portions between adjacent members of the group consisting of anchor point 127B, pulley 117A, pulley 112A, pulley 115B, pulley 112B, pulley 117B and pulley 120.

Y cable segments 125A, 125D, 125E and 125K are parallel to the X axis; segments 125B, 125C, 125F, 125G, 125H, and 125J are parallel to the Y axis. In this configuration, movement of X carriage 50 without movement of Y drive pulley 120 results in no movement of Y carriage 70 along Y bar 65. When Y drive pulley 120 is driven by the Y servo motor, motion of Y carriage 70 along Y bar 65 results.

FIG. 3A is a sectional view taken through line 3A—3A of FIG. 2A in which X bar 52, reference plate 20, and supporting structure 25 are shown in section. X carriage 50, except for certain cutaway portions, is shown in elevation. X carriage 50, which extends generally in the Y direction away from X bar 52 has a downwardly protruding lever 140 which is spring biased in a clockwise direction (as seen in FIG. 3A) to thereby bias the X carriage toward reference plate 20. Lever 140 is fitted with a sleeve 142 through which a horizontal pin 145 passes. The pin extends in the Y direction and is bifurcated and fitted with a ball bearing 147 which is free to rotate about a vertical pin 150 passing through the bifurcations. Ball bearing 147 confronts a horizontal bar 152 which extends in the X direction. The bifurcated end of pin 145 is biased away from lever 140 by spring 153. In this fashion, the compression of the spring 153 biases the X carriage downwardly. Since ball bearing 147 rotates, there is only rolling friction with bar 152 as the X carriage moves along the bar 52.

In this fashion, a limited amount of rotation of X carriage 50 about X bar 52 is possible. At least initially, i.e. when platen 12 rests on support surface 22, the rotational movement of the X carriage is in the Z direction, i.e. substantially perpendicular to both the X and the Y directions. Referring back to FIG. 2B, it can be seen that those segments of cables 95 and 125 that run between a point on the fixed structure, e.g. an anchor point or a pulley mounted to the fixed structure, and a point on the X carriage, i.e. a pulley carried thereon, are relatively close to, and are parallel with X bar 52. Thus, a rotation or pivotal movement of X carriage 50 through a limited arc (sufficient to decouple the platen 12 and Y carriage as discussed below) does not result in appreciable misalignment of the components of the X and Y drive systems (so that they continue to function properly even though the precise alignment of the components might be lost.

Figure 3B:
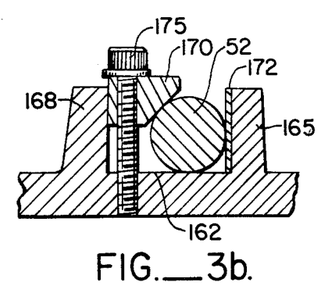
FIG. 3B is a detailed section showing a preferred mounting of the X guide bar to the support structure of the apparatus.

FIG. 3B is a detailed cross sectional view of a preferred mounting for X bar 52 to the fixed structure. X bar 52 rests on horizontal surface 162 of fixed structure and is loosely located in a groove defined by vertical flanges 165 and 168. A wedge 170 adjacent flange 168 confronts X bar 52 and holds it snug against surface 162 and flange 165. Minor adjustments in the vertical and horizontal directions can be accomplished by placing shims between the X bar and flange 165 or between the X bar and surface 162. As shown in FIG. 3B, a vertical shim 172 has been inserted between flange 165 and X bar 52 in order to reliably displace the X bar by the thickness of the shim and thereby adjust the position of the X bar in the Y direction to accurately, yet inexpensively align it in the X direction. Wedge 170 is held in place by a bolt 175.

The coupling between Y carriage 70 and platen 12 is best shown in FIGS. 3A and 4. Each of the paired wings 77 of the Y carriage has a downwardly protruding pin 80 provided with a rounded end. The upper surface of platen 12 has two pin receiving pads 180 and 182. Pad 180 has a conical hole 185 while pad 182 has a V-shaped groove 187 extending away from pad 180 in the X direction. Spring 153 (shown in FIG. 3A) biases the X and Y carriages downwardly and thereby engages the rounded pin ends with the conical hole and the V-shaped groove. In this way, platen 12 is effectively constrained to the Y carriage so that it follows motions of the latter in the horizontal plane because the interengagement of the sloped surfaces of the hole, the groove and the rounded pin ends causes the transmission of horizontally acting forces between the platen and the Y carriage. The angle of the sloping surfaces, and particularly the angle of the conical hole and the V-shaped groove is chosen so that the horizontal forces which are encountered during normal operation are positively transmitted. It is further chosen so that the Y carriage and platen will decouple if excessive forces are generated between them. In the preferred embodiment the included angle in conical hole 185 and V-shaped groove 187 is about 60°.

Figure 5A:
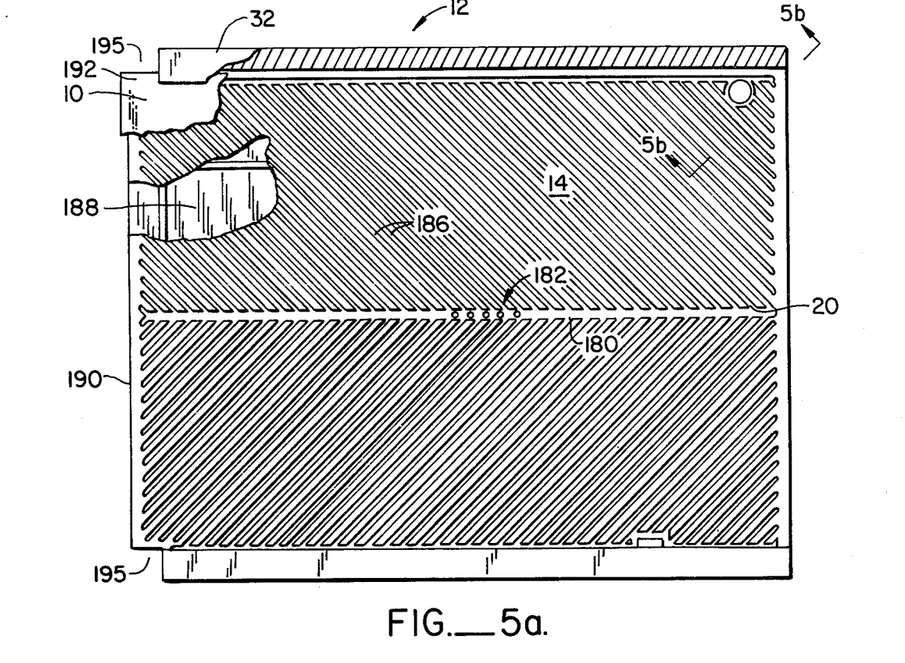
FIG. 5A is a bottom plan view, partially cut away, of the platen.

Referring to FIGS. 1 and 5A platen 12 has a film confronting side of surface 14 provided with a central channel 180 to which a vacuum is communicated via a plurality of orifices 182. Extending outwardly from vacuum channel 180 in both directions are oblique channels 186 which provide a herringbone-like pattern of channels to communicate the vacuum uniformly over platen side 14. The platen side is shown partially cut away to reveal its rigid supporting structure 188. A downstream end 190 of the platen includes lateral cutouts 195 which overlap a portion 192 of film 10 to facilitate the withdrawal of exposed film from the platen as is more fully discussed below.

Figure 5B:
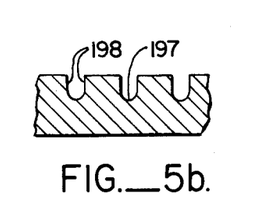
FIG. 5B is a sectional view of the platen taken along line 5B—5B of FIG. 5A.

FIG. 5B is a fragmentary sectional view and shows the general contour of the vacuum channels. In particular, it can be seen that each channel has a generally semicircular bottom portion 197 and straight sides 198.

Figure 6:
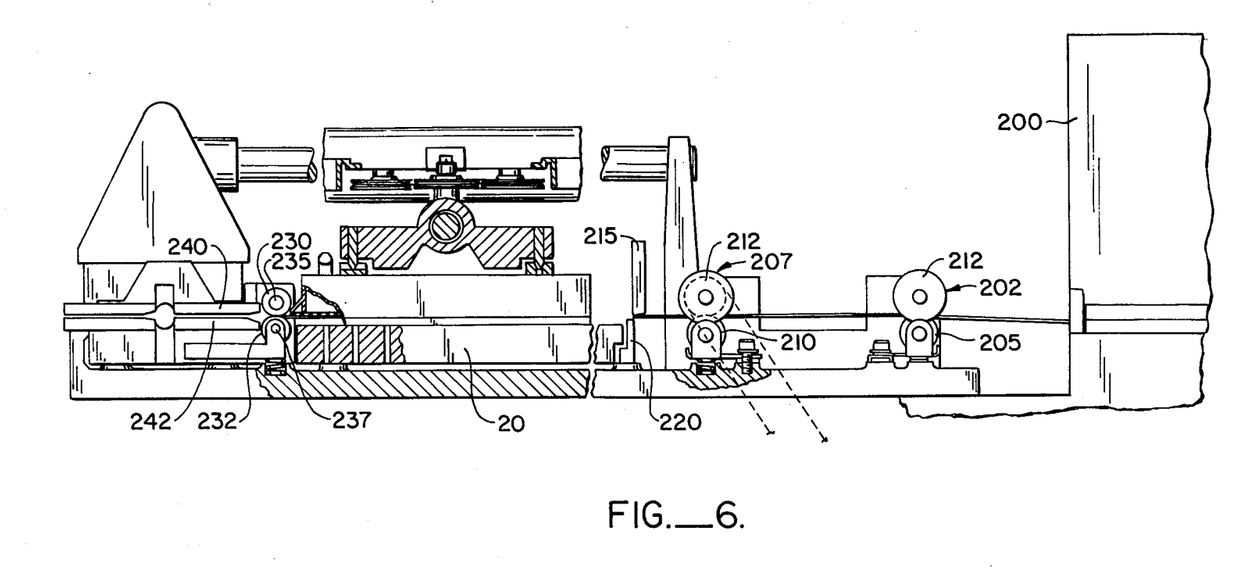
FIG. 6 is an elevation, partially cut away, taken along line 6—6 of FIG. 2A and showing the film transport system.

Another aspect of the invention is improved film transport mechanism for loading film in and unloading it from platen 12. Referring to FIGS. 2A and 6, a supply of film in roll form is stored in a film supply box 200. Film from the film box is advanced in a downstream direction towards the platen positioned on reference plate 20 by paired rollers 202, 205, 207, 210 which extend over the width of the film. It should be noted that upper rollers 202 and 207 have circular guides 212 spaced apart by the film width to prevent lateral motion of the film, i.e. motion of the film along the axis of the rollers. One of the circular guides or flanges 212 of, say, the upper roller of each pair, is fixed and defines an index for one of the longitudinal film edges. The other circular flange of each of these rollers is axially movable on the roller and biased towards the fixed flange. In this manner the indexed film edge is always at the same relative location, which is of importance for aligning the film with the platen, while the roller can accommodate the normally encountered variations in the film width. Only one of the rollers, e.g. roller 207 is driven while the others are idlers. All rollers include a resilient, e.g. rubber backing so that they can grasp film without damaging it.

Between rollers 207, 210 and reference plate 20 is a film cut off defined by a transverse, downwardly moveable upper blade 215 and a transverse, fixed lower blade 220.

When it is desired to load platen 12 with film, platen 12 is driven in the normal fashion to a position immediately adjacent cutter blades 215 and 220. It is important to align one of the grooves in platen rails 30 with the indexed film edge. This is done by correspondingly adjusting the optical position indicator 84. Once the platen is properly aligned, roller 207 is actuated for a number of revolutions sufficient to feed a length of film, i.e., the standard length of a microfiche in the X direction over the reference plate 20 and into the grooves of platen rails 30. Contact between the film and the reference plate is prevented by an air bearing generated by pressurized air escaping from a multiplicity of orifices 225 in reference plate 20 and arranged along the direction of travel of fresh film as it moves into the platen. When the proper length of film has been advanced, vacuum is communicated to platen 12 so as to bias the film upwardly against film confronting side 14 and upper blade 215 is moved downward to sever the advanced length of film or microfiche from the supply.

The film withdrawal system is located downstream (to the left as seen in FIG. 6) of reference plate 20. Paired upper rollers 230 and lower rollers 232 located on shafts 235 and 237 respectively, are relatively narrow and separated by a distance that is at least as great as the width of the downstream edge 190 of platen 12, but less than the overall width of film 10. Thus, side portions 192 of the film which overlap cutouts 195 in the platen are engaged by roller pairs 230 and 232 when the platen is in its home position immediately adjacent said roller pairs as controlled by position indicators 83 and 84. Suitable film guides 240 and 242 support the edges of the film once it has passed out of platen 12.

When it is desired to remove film 10 from platen 12, platen 12 is driven in the normal way to a position immediately adjacent roller pair 230 and roller pair 232. These rollers engage the film, but are driven with a sufficiently low torque that no lateral movement of the film from platen 12 occurs so long as vacuum is still maintained. As soon as the vacuum to platen 12 is released, the rollers pull the film out of the platen. The tendency of the film to sag and contact reference plate 20 is countered by the provision of an air bearing just as is supplied when the film is being loaded into platen 12 before vacuum is applied.

Once the exposed film has been removed from the platen, it conventionally passes to a processor where it is typically developed, fixed and dried. The film is then ready for use and/or duplication.

We claim:

1. Apparatus for recording a multiplicity of images in a rectilinear fashion on a microfiche, the apparatus comprising: means for projecting an image into an image plane; film holding means adapted to receive a microfiche to be exposed to images generated by the projecting means; an X-carriage; means for guiding the X-carriage in an X-direction; a Y-carriage; means mounted to the X-carriage for guiding the Y-carriage in a Y-direction perpendicular to the X-direction; connector means mounting the film holding means to the Y-carriage; means for independently reciprocating the X-carriage and the Y-carriage along the respective guiding means in the X-direction and the Y-direction; and means permitting arcuate movement of the X-carriage and, therewith, of the Y-carriage and the film holding means in a Z-direction which is substantially perpendicular to the X- and Y-directions.

2. Apparatus according to claim 1 wherein the Z-direction moving means comprises means permitting pivotal movement of the X-carriage about a pivot axis which extends in the X-direction.

3. Apparatus according to claim 2 wherein the X-direction guiding means is defined by a cylindrical elongate bar extending in the X-direction; and wherein the pivotal movement permitting means is defined by a journal bearing engaging the bar, longitudinally movable therealong, and permitting relative pivotal movements between the bar and the bearing and thereby, the X-carriage.

4. Apparatus according to claim 3 wherein the apparatus includes a support structure, wherein the journal bearing is mounted to the X-carriage, and including means rigidly securing the bar to the structure.

5. Apparatus according to claim 4 including means for adjusting the position of the bar by relatively minor amounts in the Y-direction.

6. Apparatus according to claim 5 wherein the bar adjusting means comprises a pair of spaced apart, aligned members defined by the structure, the members defining a groove having a width in the Y-direction greater than a diameter of the bar, and including means biasing the bar in the Y-direction.

7. Apparatus according to claim 6 including at least one shim between one of said spaced members and the bar to thereby adjust the bar in the Y-direction by the thickness of the shim.

8. Apparatus according to claim 1 wherein the connector means comprises a flat support plate which is parallel to the image projection plane for supporting the film holding means and permitting it to move thereover in the X and Y-directions; means biasing the X-carriage and therewith the Y-carriage in the Z-direction towards the support plate; and pin means and cooperating depressions in the Y-carriage and the film holding means biased into mutual engagement by the biasing means for interconnecting the film holding means and the Y-carriage and enabling the transfer of forces therebetween which act in directions parallel to the support surface.

9. Apparatus according to claim 8 wherein the depressions are defined by tapered sides, and wherein the pin means include curved surfaces arranged and dimensioned to engage the tapered sides and permit the transfer of said forces.

10. Apparatus according to claim 9 wherein at least one of the tapers has an included angle of no more than about 60°.

11. Apparatus according to claim 10 wherein one of the depressions is defined by a generally V-shaped groove, and another one of the depressions is defined by a generally conically shaped bore.

12. Apparatus according to claim 11 wherein the V-shaped groove and the conical bore are defined by the film holding means, and wherein the pin means are secured to the Y-carriage.

13. Apparatus according to claim 1 wherein the Y-direction guiding means comprises an elongated, cylindrical rod; a pair of spaced apart elements, generally defining V-shaped grooves aligned in the Y-direction, and defined by the X-carriage; and means firmly pressing the rod into the V-grooves to thereby align the rod with the grooves and secure it to the X-carriage.

14. Apparatus according to claim 1 including a support structure and wherein the means for driving the carriages in the X and the Y-directions comprises a first cable including means anchoring ends thereof to the structure; means securing intermediate portions of the cable to the X-carriage; a first drive motor engaging the first cable for selectively moving the cable in opposite directions to thereby cause corresponding movements of the X-carriage along the X-guiding means; a second cable including means securing ends thereof to the structure; means operatively coupling intermediate portions of the cable to the X-carriage and to the Y-carriage so that movement of the X-carriage result in corresponding movement of the Y-carriage in the X-direction only; and a second drive motor engaging the second cable for selectively moving the second cable in opposite directions to thereby induce corresponding movements of the Y-carriage only along the Y-guiding means.

15. Apparatus according to claim 14 including spring means for maintaining a substantially constant tension in the cables.

16. Apparatus according to claim 15 including means for mounting the X-guiding means to the structure; wherein the means permitting X-carriage movements in the Z-direction comprises means permitting pivotal movements of the carriage about a longitudinal axis of the X-guiding means; and including means positioning sections of the first and second cables between the respective drive motors and the X-carriage proximate said axis; whereby pivotal movements of the X-carriage in the Z-direction do not cause substantial deformations of said cable sections.

17. Apparatus for recording a multiplicity of images in a rectilinear fashion on a microfiche, the apparatus comprising: a support structure, including a flat support surface; means for projecting an image onto an image plane which is parallel to the support surface; film holding means supported on and movable over the surface adapted to receive a microfiche for exposure of different portions of the fiche to images generated by the projecting means; a carriage for movement in a pair of perpendicular directions parallel to the support surface including a carriage arm member having an elongated bar, and means securing respective ends of the bar to the member and orienting such bar in one of the directions, a sled movably engaging the bar for movement therealong in said one direction; the sled and the film holding means defining cooperating protrusions and depressions facing in a third direction substantially perpendicular to the first and second directions for releasably interconnecting the sled and the film holding means and enabling the transfer therebetween of forces acting substantially parallel to the support; a substantially cylindrical rod extending in the other one of said directions; means for rigidly securing ends of the rod to the structure; the carriage arm including bearing means slidably engaging the rod for longitudinal movement therealong in the other direction and for pivotal movements thereabout at least an initial portion of which extends essentially in the Z-direction when the film holding means is supported by the surface; means for pivotally biasing the carriage arm about said rod to thereby bias the depressions and protruberances into mutual engagement; first drive means for reciprocating the carriage arm along the rod including a first reversible drive motor, in operative engagement with a first cable having ends anchored to the structure, and means mounted to the carriage arm for imparting cable movements to the arm to thereby move the arm and therewith the sled and the film holding means in the other direction; and second drive means including a second reversible motor in operative engagement with a second cable having ends anchored to the structure, the second drive means including a first plurality of pulleys mounted to the carriage arm at a location intermediate the rod and the sled so that pivotal movements of the carriage arm do not substantially affect the alignment of second cable sections between the pulleys and the second motor, a second plurality of pulleys mounted to the carriage arm on the side of the sled remote from the rod, and a third plurality of pulleys mounted to the sled for engaging second cable strands emanating from the first and second plurality of pulleys, respectively, to thereby impart motion to the sled in response to the actuation of the second drive motor, whereby operation of the first drive means to move the carriage arm in the other direction results in no movement of the sled in said one direction.

18. Apparatus according to claim 17 wherein the film holding means includes a side facing the surface and means defining a pair of opposite, parallel grooves located between the side and the surface and dimensioned to receive lateral edges of a microfiche for holding the microfiche during the recordation of the images; and further including means carried by the structure for advancing a fresh microfiche in a downstream direction over the surface; means for mutually aligning at least one edge of the fresh microfiche and at least one of the grooves so that such edge of a fresh microfiche being advanced over the surface is received between the grooves and retained to the sled; means for forming an air bearing between the surface and the fresh microfiche being advanced into engagement with the grooves; and means for withdrawing an exposed microfiche in a downstream direction from engagement with the grooves for further processing.

19. Apparatus according to claim 18 wherein the film holding means includes a film holding platen which defines the side; wherein the grooves extend along lateral edges of the platen and the platen further defines an upstream edge and a downstream edge which are generally perpendicular to the lateral edges; the platen including at least one cutout extending from the downstream edge in an upstream direction and overlapping a portion of the fiche carried by the platen; the apparatus further including means for locating the platen in a withdrawal position; and wherein the withdrawing means includes at least one roller rotatably carried by the structure and dimensioned and positioned to extend into the platen cutout and to engage such film portion; whereby the actuation of said roller withdraws the exposed microfiche from the platen and transports it in a downstream direction for further processing.

20. Apparatus according to claim 17 including spring means for maintaining a substantially constant tension in the cables.

21. Apparatus according to claim 20 including means positioning sections of the first and second cables between the respective drive motors and the axis of the rod; whereby relatively minor pivotal movements of the arm about said axis sufficient to separate the protrusions and depressions do not cause substantial deformations of said cable sections.

22. Apparatus for recording a multiplicity of images on a microfiche comprising: a structure including a flat support surface, the surface including an aperture; means for projecting images through the aperture for recordation on the microfiche; film holding means having a side facing the surface and including a pair of opposite, parallel rails projecting from the side towards the surface, each rail including means for engaging edges of the microfiche; a carriage; means securing the holding means to the carriage so that the side is proximate the surface; means for moving the carriage in perpendicular first and second directions which are parallel to the surface; a film supply carried by the structure adapted to be severed into individual microfiches; means for indexing an edge of the film proximate the surface; means for advancing fresh film from the supply over the surface in a downstream direction; means for locating the film holding means in a position adjacent the film advancing means in which one of the edge engaging means of the rails is aligned with the indexed film edge; means located adjacent the support surface for severing a microfiche which has been advanced over the surface and into engagement with the rails from the film supply; means for forming an air bearing between the surface and a microfiche being advanced into engagement with the rails; means for biasing film against the side during the exposure of the fiche to images from the image projecting means; and means for withdrawing an exposed microfiche in a downstream direction from engagement with the rails for further processing.

23. Apparatus according to claim 21 wherein the air bearing forming means comprises a plurality of openings in the surface, the apertures extending along the downstream travel path of fresh microfiche into and out of engagement with the rails, and a source of pressurized air fluidly communicating with the openings for flowing such air against the side of the fiche facing the surface so that contact between such side of the film and the surface is prevented until the film biasing means is actuated.

24. Apparatus according to claim 23 including means for continuously flowing the pressurized air so that the air bearing is also formed during the withdrawal of the exposed microfiche.

25. Apparatus according to claim 22 wherein the film holding means includes a film holding platen which defines the side; wherein the rails are attached to the platen adjacent lateral edges thereof and extend parallel to the direction in which fresh film is advanced over the surface and is thereafter withdrawn from its engagement with the rails; the platen including at least one cutout extending from a downstreammost edge of the platen in an upstream direction, the cutout overlapping a portion of the fiche when biased against the side of the platen; the apparatus further including means for locating the platen in a withdrawal position; and wherein the withdrawing means includes at least one roller rotatably carried by the structure and dimensioned and positioned to extend into the platen cutout and to engage such film portion; whereby the actuation of said roller withdraws the exposed microfiche from the platen and transports the microfiche in a downstream direction for further processing.

26. Apparatus according to claim 22 wherein the rails slidably engage the surface; wherein the means securing the film holding means to the carriage comprises a plurality of depressions and a plurality of cooperating pin means carried by the carriage and by the film holding means for engaging the depressions with the pin means, the depressions and the pins extending in a direction substantially perpendicular to the surface, the pins and the depressions forming surface portions which are angularly inclined relative to said surface by an angle of less than 90°; and means for biasing the carriage towards the surface to thereby bias the depressions and the pin means into mutual engagement to enable the transmission of forces between the pin means and the depressions which act parallel to the surface so that movements of the carriage in said perpendicular directions is imparted to the film holding means while enabling the separation of the two in the event an excessive force between them is generated.

27. Apparatus for recording images side by side on a microfiche comprising: means for generating images to be recorded on the microfiche; a film holder for presenting different portions of the fiche to the projected images; a support structure; an arm for movement in a first direction; means mounted to the structure for guiding the arm during its movements in the first direction; a carriage for movement in a second direction which is perpendicular to the first direction; means carried by the arm for guiding the carriage during its movements in the second direction; means connecting the holder to the carriage; first drive means including a reversible motor, a first cable in operative engagement with the first motor for reciprocating the first cable, and means operatively connecting the first cable with the arm for imparting movements of the first cable to the arm to thereby reciprocate the arm in the first direction; second drive means including a second reversible motor and a second cable operatively engaged by the second motor for reciprocating the second cable, the second drive means including means for anchoring ends of the second cable to the support structure, means mounting the second motor to the support structure, the second cable having first and second strands extending between the second motor and the respective second cable ends, a plurality of first pulleys mounted to the arm adjacent one end thereof and engaging the first strand, a plurality of second pulleys mounted to the arm adjacent another end thereof and engaging the second strand, and a plurality of third pulleys mounted to the carriage and engaging, respectively, the first and second strands; whereby the actuation of the first motor causes the movement of the arm in the first direction without changing the relative length of the first and second strands so that no movements of the carriage in the second direction occurs, and the actuation of the second motor causes the movement of the carriage in the second direction by correspondingly lenghtening and shortening the first and second strands.

28. Apparatus according to claim 27 wherein the arm guiding means comprises an elongated, round rod, wherein the arm includes a journal bearing slidably engaging the rod and permitting pivotal movements of the arm thereabout, and wherein the plurality of first pulleys is positioned proximate the rod so as to reduce misalignments of the first cable strand due to pivotal movements of the frame; and further including means for limiting the pivotal movements of the arm.

29. Apparatus according to claim 28 including a plurality of fourth pulleys mounted to the arm proximate the rod, engaging the second strand, and disposed therealong between the plurality of second pulleys and the second motor and a corresponding end of the second strand anchored to the support structure.

30. Apparatus according to claim 27 wherein the connecting means comprises a flat support plate which is parallel to an image plane of the projected images for supporting the film holder and permitting it to move thereover in the first and second directions; means biasing the arm and therewith the carriage in a third direction which is perpendicular to the first and second directions towards the support plate; and pin means and cooperating depressions in the carriage and the film holder biased into mutual engagement by the biasing means for interconnecting the film holder and the carriage and enabling the transfer of forces therebetween which act in directions parallel to the support surface.

31. Apparatus according to claim 30 wherein the depressions and pin means include cooperating sides which are angularly inclined relative to the support plate by an angle of less than 90° to permit the transfer of said forces.

32. Apparatus according to claim 31 wherein one of the depressions is defined by a generally V-shaped groove extending in the first direction, and another one of the depressions is defined by a generally conically shaped bore.

33. Apparatus for recording images side by side on a microfiche comprising in combination: means for generating images to be recorded on the microfiche; a film holder for presenting different portions of the fiche to the projected images, the holder having a side facing the projected images and including a pair of parallel, opposite rail means projecting from the side towards the projected images, each rail means including means for engaging edges of a microfiche; a support structure; an arm for movement in a first direction; means mounted to the structure for guiding the arm during its movements in the first direction; a carriage for movement in a second direction which is perpendicular to the first direction; means carried by the arm for guiding the carriage during its movements in the second direction; the carriage and the film holder defining cooperating protrusions and depressions facing in a third direction substantially perpendicular to the first and second direction for releasably interconnecting the carriage and the film holder and enabling the transfer therebetween of forces acting in a plane coincident with the first and second directions; means carried by the structure and engaging the rail means for supporting the film holder during its movement in the first and second directions; a film supply carried by the structure and adapted to be severed into individual microfiches; means disposed proximate the support means for indexing an edge of the film; means for advancing fresh film from the supply over the support means in a downstream direction; means for locating the film holder in a position adjacent the film advancing means in which one of the edge engaging means of the rail means is aligned with the indexed film edge; means located adjacent the support means for severing from the film supply a microfiche which has been advanced over the support means and into engagement with the rails; means for forming an air bearing between the support means and a microfiche being advanced into engagement with the rails means; means for biasing film against the side during the exposure of the fiche to projected images; means for withdrawing an exposed microfiche in a downstream direction from engagement with the rail means for further processing including a cutout in the film holder facing in a downstream direction and arranged to overlap a portion of the microfiche held by the holder, means for locating the holder in a withdrawal position, and at least one roller rotatably carried by the structure and dimensioned and positioned to extend into the cutout and to engage said microfiche portion, whereby the actuation of the roller when the holder is in the withdrawal position causes the withdrawal of the exposed microfiche; a substantially cylindrical rod mounted to the support structure and extending in the first direction; bearing means carried by the arm and slidably engaging the rod for longitudinal movement therealong in the first direction and permitting pivotal movement relative to the rod, at least an initial portion of which extends in the third direction; means for pivotally biasing the arm about said rod to thereby bias the depressions and protruberances into mutual engagement and the holder against the support means; first drive means including a reversible motor, a first cable in operative engagement with the first motor for reciprocating the first cable, and means operatively connecting the first cable with the arm for imparting movements of the first cable to the arm and to thereby reciprocate the arm in the first direction; second drive means including a second reversible motor and a second cable operatively engaged by the second motor for reciprocating the second cable, the second drive means including means for anchoring ends of the second cable to the support structure and means mounting the second motor to the support structure, the second cable having first and second strands extending between the second motor and the respective second cable ends, a plurality of first pulleys mounted to the arm adjacent one end thereof and engaging the first strand, a plurality of second pulleys mounted to the arm adjacent another end thereof and engaging the second strand, and a plurality of third pulleys mounted to the carriage and engaging, respectively, the first and second strands; whereby the actuation of the first motor causes the movement of the arm in the first direction without changing the relative length of the first and second strands so that no movement of the carriage in the second direction occurs, and the actuation of the second motor causes the movement of the carriage in the second direction by correspondingly lengthening and shortening the first and second strands.

34. Apparatus for recording a plurality of images on a microfilm comprising,
 means for projecting an image into an image plane,
 film holding means for receiving a microfilm to be exposed to images generated by said projecting means, a
 first carriage,
 means for guiding said first carriage in a first direction, a
 second carriage,
 means on said first carriage for guiding said second carriage in a second direction perpendicular to said first direction,
 means coupling the film holding means to the second carriage,
 means for moving the first carriage and the second carriage along the respective guiding means in the first direction and in the second direction, and
 means permitting arcuate movement of the first carriage and of the second carriage along with the film holding means in a third direction substantially perpendicular to the first and the second directions.

35. Apparatus according to claim 34 wherein the third direction moving means comprises means permitting pivotal movement of the first carriage about an axis extending in the first direction.

36. Apparatus according to claim 34 wherein the third direction moving means comprises bearing means permitting swingable movement of the first carriage about an axis extending in the first direction.

37. Apparatus according to claim 34 wherein said first direction guiding means comprises a shaft extending in the first direction and wherein the arcuate movement permitting means comprises a bearing member operable with said shaft.

38. Apparatus for recording a plurality of images on a microform comprising a
 support member defining an aperture therethrough,
 means for projecting images through the aperture and onto the microform,
 microform holding means having portions projecting from one side thereof for engaging edges of the microform, a
 form supply positioned adjacent the support member,
 means for advancing form material from the supply along a path to be engaged by the portions of said holding means,
 means for severing a predetermined length of form from the supply thereof when the form material is engaged by the projecting portions,
 means forming an air bearing for holding said form material distal from said support member as said form material is moved into position to be engaged by said projecting portions, and
 means for biasing said form material against said side of said microform holding means during exposure of the form material to said images.

39. Apparatus according to claim 38 including means for withdrawing an exposed microform from engagement with said projecting portions.

40. Apparatus according to claim 38 wherein the air bearing forming means comprises a plurality of openings in said support member.

* * * * *